United States Patent Office 3,492,090
Patented Jan. 27, 1970

3,492,090
PROCESS FOR PRODUCING FAUJASITE
Edwin E. Jenkins, Elmer, N.J., assignor to Mobil Oil Corporation, a corporation of New York
No Drawing. Filed Apr. 7, 1966, Ser. No. 540,803
The portion of the term of the patent subsequent to Mar. 18, 1986, has been disclaimed
Int. Cl. C01b 33/26
U.S. Cl. 23—113                    11 Claims

ABSTRACT OF THE DISCLOSURE

The invention is directed to a process for producing faujasitic crystalline aluminosilicate in which a faujasite producing aqueous reaction mixture is formed, the invention being grounded in maintaining the water content of the resulting filter cake to a specified amount.

This invention relates to a process for preparing faujasitic aluminosilicate materials. More particularly, this invention relates to a process for preparing zeolite Y wherein the volume of reactants is greatly reduced prior to crystallization thereof.

Zeolite Y is a crystalline aluminosilicate containing uniform pores interlaced throughout its crystalline structure. Zeolite Y finds extensive use as a selective adsorbent and as a starting material for superactive catalysts. In order to afford such uses, removal of water from the pores is effected to permit adsorption of reactants into the pores. The formula for the sodium form of zeolite Y can be expressed in terms of oxide mole ratios as follows:

$$0.9 \pm 0.2 Na_2O : Al_2O_3 : wSiO_2 : yH_2O$$

wherein $w$ is a value ranging from 3 to 6 and $y$ may be any value up to about 9. Zeolite Y and a process for making the same are described in U.S. Patent 3,130,007.

At the present time, zeolite Y is prepared by mixing in a first step, particular amounts of silica, alumina and alkali metal oxides from various sources in the presence of an aqueous medium. At the present time, the source of silica employed as a starting materal will vary, depending upon the silica to alumina ratio desired in the zeolite Y product. The starting materials, prior to mixing, can be in solid form or in aqueous solution, but in any event, it is desirable that the three components be mixed in an aqueous medium. The function of the aqueous medium is to facilitate homogeneous mixing of the reactants which results in decreased reaction time and a relatively homogeneous product. The mixtures, in the aqueous medium, are then allowed either to form a gel or to form a liquid-solid two phase system. The homogeneous mixture, either in gel form or in the two phase system is then heated in a manner such that the desired crystalline product is formed. The crystalline product which results is then separated from solution as for example, by filtration.

Up to the time of the present invention, it has been thought desirable to maintain the original volume of aqueous medium throughout the process up to the point of crystal filtration in order to maintain the mixture in a homogeneous state. This has been considered important since it has been thought that the maintainance of a homogeneous reaction mixture in this manner prior to crystallization is necessary in order to regulate proper crystal growth. It has been thought that without consistent regulation of reactant composition and process conditions prior to crystallization that the less desirable but more thermally stable P and S form crystalline aluminosilicates would be formed during the crystallization step. Unfortunately, such processes required relatively large volumes of material to be processed in order to obtain a relatively small amount of crystalline product. This factor seriously detracts from the economies which could be realized when a continuous process is employed over a batch process. Even though a continuous type process in general may be economically advantageous over a batch type process, in the present situation, the incentive for employing such a process is seriously impaired from an economic standpoint due to the relatively large volumes of material to be handled.

It has now been found unnecessary to maintain a relatively large amount of aqueous medium subsequent to the mixing of the reactants to produce the desired crystalline structure. That is, it has been found that a large amount of aqueous medium can be removed after mixing of the reactants without impairing the quality of the product obtained. This is of substantial significance from an economic standpoint in that now a continuous process can be employed wherein a high percentage of the material processed is converted to crystalline zeolite Y.

In the process of this invention, the reactants comprising sources of silica, alumina and alkali metal oxide are mixed in a manner to promote the production of zeolite Y. In addition, the mixing is carried out in a manner to promote the production of zeolite Y having a silica to alumina mole ratio preferably above about 3.9 from water-soluble sources of silica. The mixing is carried out in a manner to produce a crystallization directing agent in a preliminary step. The crystallization directing agent is then digested at a time and temperature so that zeolite Y is formed in the crystallization step. It is theorized that zeolite Y crystal nuclei are formed in the digestion step. Although this theory is an explanation for the production of zeolite Y in the crystallization step, it is not applicant's intention to be limited thereby. Subsequently, desired amounts of silica and alumina are added to the crystallization directing agent. The resultant mixture is directed to a water removal step to remove water therefrom, as for example, by filtration or vacuum distillation to produce a cake. It is desirable to remove as much water as possible without seriously affecting the rate of crystallization. For purposes of the invention, the amount of water which remains in the cake is between about 65 and about 80 weight percent based upon the total weight of cake. When the cake contains less than about 65 weight percent water, the zeolite Y crystallization rate is reduced and undesirable crystalline aluminosilicate species may be formed. When the cake contains more than about 80 weight percent water, the advantages gained in reducing reactant volume becomes minimal. The cake is then maintained at a temperature sufficient to promote crystallization. Crystallization of the cake can be carried out at a temperature of from room temperature to about 300° C. and preferably at a temperature of from about 60° C. to about 150° C. for a period of time of from about 1 hour to about 240 hours with time being an inverse function of temperature to crystallize the cake to zeolite Y. The zeolite Y crystals are then separated from the remaining water, recovered and dried.

In the process of this invention, water-soluble sources of silica are employed, such as silicic acid and alkali metal silicates, as for example sodium silicate and sodium metasilicate. These sources of silica are highly desirable since easily pumpable aqueous media can be produced therefrom. Hence these sources of silicia facilitate the use of a continuous process in preparing zeolite Y. Zeolite Y, preferably having a silica to alumina mole ratio above about 3.9 and more preferably above about 4.5 can be produced while employing these water-soluble sources of silica. It is highly desirable to produce zeolite Y having high silica to alumina mole ratios above about 4.5, since the zeolite product and catalysts produced therefrom are usually characterized by improved acid, steam and thermal stability. Sources of alumina which can be employed in the process of this invention include water-soluble aluminum salts such as aluminum sulfate, aluminum chloride, aluminum acetate and sodium aluminate.

A number of reactant mixing procedures can be employed in the process of this invention. One procedure, hereinafter identified as Procedure A, comprises mixing in a first step the alkali metal hydroxide either in solid form or in aqueous solution with a source of silica in aqueous solution. The reactants are mixed so as to maintain a ratio of alkali metal oxide to $SiO_2$ in the range of from about 0.9 to about 7.3. It is desirable to maintain the temperature of the resultant aqueous solution above about 140° F. to prevent precipitation of alkali metal silicate. The solution is then directed to admixture with a source of alumina to obtain a crystallization directing agent which has a composition expressed as oxide mole ratios within the following ranges:

|  | Broad | Preferred |
| --- | --- | --- |
| $SiO_2/Al_2O_3$ | 2 to 40 | 9 to 30. |
| Alkali metal oxide/$SiO_2$ | 0.7 to 6.0 | 1.0 to 3.0. |
| $H_2O$/alkali metal oxide | 12 to 300 | 15 to 40. |

The crystallization directing agent is heated in a digestion step at a temperature and time so that zeolite Y is produced in the final crystallization step. The digestion step is carried out so that a clear solution is maintained without observable crystal formation. It is preferred to employ a temperature in the digestion step of from about 25° C. to about 80° C. for a time of from about ½ hour to about 24 hours. The heating necessary to effect the desired digestion can be carried out directly following the preparation of the crystallization directing agent or by partial heating at this stage followed by heating after the crystallization directing agent has been mixed with an additional source of silica or additional source of alumina. The heated crystallization directing agent is continuously mixed with a source of alumina and a source of silica in separate streams to obtain a composition expressed in mole ratios as follows:

|  | Broad | Preferred |
| --- | --- | --- |
| Alkali metal oxide/$SiO_2$ | 0.32 to 0.7 | 0.34 to 0.5. |
| $SiO_2/Al_2O_3$ | 6 to 60 | 12 to 22. |
| $H_2O$/alkali metal oxide | 25 to 300 | 60 to 300. |

For economic reasons, it is preferred that the mixing with the additional silica be performed in a single step. The same is true for the mixing with the additional alumina. But to perform these additions in a series of steps is within the scope of this invention. The resultant mixture is a gelatinous slurry and is directed to a water removal step to produce a cake having from about 65 to about 80 weight percent water. The cake has a composition, expressed as oxide mole ratios as follows:

|  | Broad | Preferred |
| --- | --- | --- |
| $SiO_2/Al_2O_3$ | 4 to 15 | 7 to 15. |
| Alkali metal oxide/$SiO_2$ | .25 to .60 | .37 to .50. |
| $H_2O$, weight percent | 65 to 80 | 65 to 75. |

The cake is crystallized and precipitated under the conditions set forth above. The precipitated zeolite Y is then separated from aqueous solution as for example by filtration.

A procedure similar to Procedure A, hereinafter referred to as Procedure C, also can be employed for mixing the reactants to subsequently obtain zeolite Y. In this procedure, a source of alumina and an alkali metal hydroxide are mixed in the presence of water in a first step. Care should be taken in this step to prevent the formation of an alumina gel to permit subsequent homogeneous mixing with a source of silica. To prevent alumina gel formation in this step, the pH of the mixture is maintained above about 11.8. It is preferred to employ an alkali metal aluminate such as sodium aluminate in this step since high pH can be easily maintained. This mixture is then mixed with a source of silica to produce a crystallization directing agent having a composition, expressed as oxide mole ratios as follows:

|  | Broad | Preferred |
| --- | --- | --- |
| $SiO_2/Al_2O_3$ | 2 to 40 | 9 to 30. |
| Alkali metal oxide/$SiO_2$ | 0.7 to 6.0 | 1.0 to 3.0. |
| $H_2O$/alkali metal oxide | 12 to 300 | 15 to 40. |

The crystallization directing agent is heated in a digestion step wherein it is digested in a manner discussed above for Procedure A. The heating necessary to form the desired crystal nuclei can be effected directly following the preparation of the crystallization directing agent or by partial heating at this stage followed by heating after the crystallization directing agent has been mixed with either an additional source of alumina or source of silica. The crystallization directing agent is continuously mixed with a source of alumina and a source of silica in separate streams to obtain a composition expressed as oxide mole ratios as follows:

|  | Broad | Preferred |
| --- | --- | --- |
| $SiO_2/Al_2O_3$ | 6 to 60 | 12 to 22. |
| Alkali metal oxide/$SiO_2$ | 0.32 to 0.7 | 0.34 to 0.5. |
| $H_2O$/alkali metal oxide | 25 to 300 | 60 to 300. |

The resultant mixture is directed to a water removal step to produce a cake having from about 65 to about 80 weight percent water. The cake has a composition, expressed as oxide mole ratios as follows:

|  | Broad | Preferred |
| --- | --- | --- |
| $SiO_2/Al_2O_3$ | 5 to 15 | 7 to 15. |
| Alkali metal oxide/$SiO_2$ | .25 to .60 | .37 to .50. |
| $H_2O$ weight percent | 65 to 80 | 65 to 75. |

The cake is crystallized, precipitated and recovered under the conditions set forth above.

An alternate procedure for mixing the reactants, hereinafter referred to as Procedure B, comprises in a first step, preparing a hydrogel composition from a water-soluble source of silica and a source of alumina. The hydrogel is mixed with a source of alkali metal oxide to produce a crystallization directing agent solution having a composition, expressed as oxide mole ratios as follows:

|  | Broad | Preferred |
| --- | --- | --- |
| $SiO_2/Al_2O_3$ | 2 to 40 | 9 to 30. |
| Alkali metal oxide/$SiO_2$ | 0.7 to 6.0 | 1.0 to 3.0. |
| $H_2O$/alkali metal oxide | 12 to 300 | 15 to 40. |

The crystallization directing agent is heated in a digestion step in a manner described above for Procedure A. The crystallization directing agent is mixed with additional silica-alumina hydrogel to obtain a homogeneous mixture having a composition, expressed as oxide mole ratios as follows:

|  | Broad | Preferred |
| --- | --- | --- |
| $SiO_2/Al_2O_3$ | 6 to 60 | 12 to 22. |
| Alkali metal oxide/$SiO_2$ | 0.32 to 0.7 | 0.34 to 0.5. |
| $H_2O$/alkali metal oxide | 25 to 300 | 60 to 300. |

This mixture is then directed to a water removal step to produce a cake containing from about 65 to about 80 weight percent water. The cake has a composition expressed as oxide mole ratios as follows:

|  | Broad | Preferred |
| --- | --- | --- |
| $SiO_2/Al_2O_3$ | 4 to 15 | 7 to 15. |
| Alkali metal oxide/$SiO_2$ | .25 to .60 | .37 to .50. |
| $H_2O$, weight percent | 65 to 80 | 65 to 75. |

The cake is crystallized and precipitated under the conditions set forth above. The precipitated zeolite Y is then separated from aqueous solution as for example by filtration.

In a preferred embodiment of this invention, the process is carried out in a continuous manner. In mixing the reactant materials, either Procedure A or Procedure C is particularly adaptable for use in a continuous process. In Procedure A, and Procedure C, the reactants do not set to a gel. Hence, transportation of the reactants from one step to another can be accomplished relatively simply. On the other hand, when a gel is formed in one of the mixing steps, transportation to the next step becomes difficult. It may be necessary to interpose an intermediate stirring step to reduce the gel to a slurry prior to transporting to the next step in the process. An equally undesirable alternative would be to greatly increase available pumping power sufficient to pump the gel to the next step. Although it is possible to conduct a continuous process for producing zeolite Y when a gel is produced in the mixing step (Procedure B), such a process is not as economically attractive as a process where a gel is not produced.

When employing Procedure A, an aqueous solution is produced when alkali metal hydroxide and a source of silica are mixed in the first step. In the second step, a gelatinous slurry is produced when a source of alumina is added to the solution. A gel is not formed when the slurry is heated in the digestion step. Additional silica and alumina are added in separate streams to the digested slurry in a continuous manner to prevent the resultant mixture from setting to a gel. The resultant mixture is a gelatinous slurry which is directed to the water removal step and the crystallization step and treated therein in a manner described above. Similarly, solutions and gelatinous slurries are obtained in the process when Procedure C is employed for mixing the reactants.

The water removal step to produce a cake can be conducted in a number of ways, as for example, filtration, vacuum distillation, centrifuging, decantation and the like, or a combination of these processes. Care should be taken during the water removal step that conditions of temperature and time be maintained such as to not promote the crystal growth of the undesirable P and S species of crystalline aluminosilicates. During the water removal step, the temperature of the reactants should be maintained below about 120° C. and preferably below about 100° C.

The process of this invention can be carried out either in a batch-wise or continuous manner. It is preferred to employ a continuous process for economic reasons. As discussed above, when mixing the reactants, Procedure A or Procedure C is preferred in a continuous process. In the continuous process, the cake produced after separating excess aqueous solution from the initial reactants can be directed and subjected to the crystallization step in a number of ways. Thus, the cake can be transported on a continuously moving belt through a heating zone, through a screw conveyor, pumped through a heated coil in the presence of a liquid hydrocarbon of relatively low viscosity which reduces scaling in the coil, or pumped through a heated coil made of low friction material such as Teflon. In any event, in the crystallization step, the reactants are maintained at a temperature of from about room temperature to about 300° C. and preferably from about 60° C. to about 150° C. for a period of time of from about 1 hour to about 240 hours and preferably from about 1 hour to about 10 hours.

The following examples are intended to illustrate the process of the present invention and are not intended to limit the same.

EXAMPLE I

An initial reaction mixture to prepare zeolite Y was prepared in a two-step manner from three separate compositions. In the first step, a solution was prepared by mixing the following ingredients:

TABLE I.—CRYSTALLIZATION DIRECTING AGENT

| Reagent | Weight, grams | Moles Na₂O | Al₂O₃ | SiO₂ | H₂O |
|---|---|---|---|---|---|
| Aqueous sodium silicate | 34.4 | .049 | | .163 | 1.35 |
| Solid sodium aluminate | 2.4 | .011 | .010 | | |
| Solid sodium hydroxide | 19.3 | .240 | | | |
| Water | 76.4 | | | | 4.25 |
| Total | 132.5 | .300 | .010 | .163 | 5.60 |

The composition of Table I was heated for ½ hour at 60° C.

The following solutions were prepared separately:

TABLE 2.—SODIUM SILICATE SOLUTION

| Reagent | Weight, grams | Moles Na₂O | SiO₂ | H₂O |
|---|---|---|---|---|
| Aqueous sodium silicate | 154.7 | .217 | .731 | 5.40 |
| Water | 154 | | | 8.55 |
| Total | 308.7 | .217 | .731 | 13.95 |

TABLE 3.—ALUMINUM CHLORIDE SOLUTION

| Reagent | Weight, grams | Moles Al₂O₃ | H₂O | Cl⁻ |
|---|---|---|---|---|
| Aluminum chloride | 12.1 | .045 | | .270 |
| Water | 170.0 | | 9.40 | |
| Total | 182.1 | .045 | 9.40 | .270 |

The crystallization directing agent (CDA) was added to the sodium silicate solution and the aluminum chloride solution to produce a homogeneous gelatinous slurry of the following composition, expressed as oxide mole ratios:

SiO₂/Al₂O₃ _____ 16.3
Na₂O/SiO₂ _____ .43
H₂O/Na₂O _____ 75.2

The slurry also contained 4.9 moles of NaCl.

The slurry was heated for 15 minutes to 100° C. and filtered to remove water and produce a cake. The cake had the following composition expressed as oxide mole ratios:

SiO₂/Al₂O₃ _____ 9.25
Na₂O/SiO₂ _____ .43

The cake contained about 72 weight percent water.

The cake was heated to about 100° C. for from 6 to 22 hours to effect crystallization to sodium zeolite Y. The crystalline product was recovered by filtration and was determined by X-ray analysis to be sodium zeolite Y. The product had the composition: .960 Na₂O—Al₂O₃—4.76 SiO₂. The product was characterized by a cyclohexane sorption at 20 mm. Hg of 20.5 weight percent and a water sorption at 12 mm. Hg of 28.9 weight percent.

EXAMPLE II

The crystallization directing agent of Example I was prepared and heated in a manner shown therein.

The following solutions were separately prepared.

TABLE 4.—SODIUM SILICATE (A) AND ALUMINUM CHLORIDE (B) SOLUTIONS

| Reagent | Weight, grams | Moles Na₂O | Al₂O₃ | SiO₂ | H₂O | Cl⁻ |
|---|---|---|---|---|---|---|
| (A) Aqueous sodium silicate | 171.9 | .241 | | .812 | 6.00 | |
| Water | 170 | | | | 9.55 | |
| (B) Aluminum chloride | 13.4 | | 0.50 | | | .300 |
| Water | 160 | | | | 9.00 | |

The crystallization directing agent was added to the sodium silicate solution and aluminum chloride solution to produce a homogeneous gelatinous slurry of the following composition expressed as oxide mole ratios:

$SiO_2/Al_2O_3$ —————————————————— 16.3
$Na_2O/SiO_2$ —————————————————— .405
$H_2O/Na_2O$ —————————————————— 76.9

The slurry also contained 5 moles of NaCl.

The slurry was filtered at room temperature to produce a cake having the following composition expressed as oxide mole ratios:

$SiO_2/Al_2O_3$ —————————————————— 9.75
$Na_2O/SiO_2$ —————————————————— .41

The cake contained about 72 weight percent water.

The cake was heated to about 100° C. for 25 hours to effect crystallization to sodium zeolite Y. The crystalline product was recovered by filtration and was determined by X-ray analysis to be sodium zeolite Y. The product had the composition: .835 $Na_2O-Al_2O_3-5.3$ $SiO_2$. The product was characterized by a cyclohexane sorption at 20 mm. Hg of 20.5 weight percent and a water sorption at 12 mm. Hg of 28.9 weight percent.

EXAMPLE III

The crystallization directing agent of Example I was prepared and heated in a manner shown therein.

The following solutions were separately prepared.

TABLE 5.—SODIUM SILICATE (A) AND ALUMINUM CHLORIDE (B) SOLUTIONS

| Reagent | Weight, grams | Moles | | | | |
|---|---|---|---|---|---|---|
| | | $Na_2O$ | $Al_2O_3$ | $SiO_2$ | $H_2O$ | $Cl^-$ |
| (A) Aqueous sodium silicate | 189.1 | 2.65 | | .893 | 6.60 | |
| Water | 162 | | | | 9.00 | |
| (B) Aluminum chloride | 14.8 | | .055 | | | .330 |
| Water | 162 | | | | 9.00 | |

The crystallization directing agent was added to the sodium silicate solution and aluminum chloride solution to produce a homogenous gelationous slurry of the following composition expressed as oxide mole ratios:

$SiO_2/Al_2O_3$ —————————————————— 16.3
$Na_2O/SiO_2$ —————————————————— .38
$H_2O/Na_2O$ —————————————————— 74.7

The slurry also contained 5.08 moles NaCl.

The slurry was filtered at room temperature to produce a cake having the following composition expressed as oxide mole ratios:

$SiO_2/Al_2O_3$ —————————————————— 10.8
$Na_2O/SiO_2$ —————————————————— .44

The cake contained about 72 weight percent water.

The cake was heated to about 100° C. for 54 hours to effect crystallization to sodium zeolite Y. The crystalline product was recoved by filtration and was determined by X-ray analysis to be sodium zeolite Y. The product had the composition 1.04 $Na_2O-Al_2O_3-5.46$ $SiO_2$. The product was characterized by a cyclohexane sorption at 20 mm. Hg of 19.9 weight percent and a water sorption at 12 mm. Hg of 28.2 weight percent.

EXAMPLE IV

The crystallization direction agent of Example I was prepared and heated in a manner shown therein.

The following solutions were separately prepared.

TABLE 6.—SODIUM SILICATE (A) AND ALUMINUM CHLORIDE (B) SOLUTIONS

| Reagent | Weight, grams | Moles | | | | |
|---|---|---|---|---|---|---|
| | | $Na_2O$ | $Al_2O_3$ | $SiO_2$ | $H_2O$ | $Cl^-$ |
| (A) Aqueous sodium silicate | 206.3 | .289 | | .975 | 7.20 | |
| Water | 168 | | | | 9.35 | |
| (B) Aluminum chloride | 16.1 | | .060 | | | .360 |
| Water | 162 | | | | 9.00 | |

The crystallization directing agent was added to the sodium silicate solution and aluminum chloride solution to produce a homogeneous gelatinous slurry of the following composition expressed as oxide mole ratios:

$SiO_2/Al_2O_3$ —————————————————— 16.3
$Na_2O/SiO_2$ —————————————————— .36
$H_2O/Na_2O$ —————————————————— 75.2

The slurry contained 5.15 moles NaCl.

The slurry was filtered at room temperature to produce a cake having the following composition expressed as oxide mole ratios:

$SiO_2/Al_2O_3$ —————————————————— 11.3
$Na_2O/SiO_2$ —————————————————— .39

The cake contained about 72 weight percent water.

The cake was heated to about 100° C. for 90 hours to effect crystallization to sodium zeolite Y. The crystalline product was recovered by filtration and was determined by X-ray analysis to be sodium zeolite Y. The product had the composition .99 $Na_2O-Al_2O_3-5.6$ $SiO_2$. The product was characterized by a cyclohexane sorption at 20 mm. Hg of 20.2 weight percent and a water sorption at 12 mm. Hg of 28.4 weight percent.

EXAMPLE V

An initial reaction mixture to prepare zeolite Y was prepared in a two step manner from three separate compositions. In a first step, a solution was prepared by mixing the following ingredients:

TABLE 7.—CRYSTALLIZATION DIRECTING AGENT

| Reagent | Weight, grams | Moles | | | |
|---|---|---|---|---|---|
| | | $Na_2O$ | $Al_2O_3$ | $SiO_2$ | $H_2O$ |
| Aqueous sodium silicate | 275.2 | .392 | | 1.304 | 10.80 |
| Solid sodium aluminate | 19.2 | .088 | .080 | | |
| Solid sodium hydroxide | 154.4 | 1.920 | | | |
| Water | 611.2 | | | | 34.00 |
| Total | 1,060.0 | 2,400 | .080 | 1.304 | 44.80 |

The composition of Table 7 was heated for ½ hour at 60° C.

The following solutions were prepared separately:

TABLE 8.—SODIUM SILICATE SOLUTION

| Reagent | Weight, grams | Moles | | |
|---|---|---|---|---|
| | | $Na_2O$ | $SiO_2$ | $H_2O$ |
| Aqueous sodium silicate | 1,100 | 1.57 | 5.22 | 38.5 |
| Water | 880 | | | 49 |
| Total | | 1.57 | 5.22 | 87.5 |

TABLE 9.—ALUMINUM CHLORIDE SOLUTION

| Reagent | Weight, grams | Moles | | |
|---|---|---|---|---|
| | | $Al_2O_3$ | $H_2O$ | $Cl^-$ |
| $AlCl_3$ | 85.6 | .32 | | 1.93 |
| $H_2O$ | 1,600 | | 89 | |
| Total | 1,685.6 | .32 | 89 | 1.93 |

The crystallization directing agent was added to the sodium silicate solution and the aluminum chloride solution to produce a homogeneous gelatinous slurry of the following composition, expressed as oxide mole ratios:

$SiO_2/Al_2O_3$ —————————————————— 16.3
$Na_2O/SiO_2$ —————————————————— .46
$H_2O/Na_2O$ —————————————————— 73.0

The slurry also contained 4.84 moles of NaCl.

The slurry was heated for 15 minutes to 100° C. and filtered to remove water and produce a cake. The cake contained about 70 weight percent water. To 1,324 grams of the cake was added 35 grams of NaOH in 350 grams of water. The resultant mixture contained about 75 weight percent water.

A slurry of this mixture and about 20 weight percent

SAE 20 oil was pumped through a ¼ inch stainless steel coil about 25 feet long. The pumping rate was about 3.5 cc. per minute. The coil was heated with steam to about 100° C.

The residence time in the coil was about 2 hours. The effluent from the coil was directed to a vessel maintained at room temperature wherein oil was decanted and crystalline product settled. Continuous pumping through the coil was maintained for about 3½ hours.

The crystalline product was recovered by filtration and was determined by X-ray analysis to be zeolite Y. The product had the composition; .98 $Na_2O$—$Al_2O_3$—3.98 $SiO_2$. The product was characterized by a cyclohexane sorption at 20 mm. Hg of 18 weight percent and a water sorption at 12 mm. Hg of 27.9 weight percent.

Having fully described the invention, I claim:

1. The process for producing faujasitic crystalline aluminosilicate which comprises:
   (a) mixing a water soluble source of silica, a source of alumina and a source of alkali metal hydroxide in the presence of water to obtain a composition expressed as oxide mole ratios in the range:

$SiO_2/Al_2O_3$ _____ 2 to 40
   Alkali metal oxide/$SiO_2$ _____ 0.7 to 6.0
   $H_2O$/alkali metal oxide _____ 12 to 300 in order to obtain a homogeneous mixture in aqueous medium,
   (b) digesting the mixture obtained in (a) at a temperature and time so that faujasite is produced in a subsequent crystallization step,
   (c) adding silica and alumina sources to the digested mixture from (b) to obtain a composition expressed as oxide mole ratios in the range:

$SiO_2/Al_2O_3$ _____ 6 to 60
   Alkali metal oxide/$SiO_2$ _____ 0.32 to 0.7
   $H_2O$/alkali metal oxide _____ 25 to 300

(d) removing aqueous medium from the composition obtained in (c) to obtain a cake containing from about 65 to about 80 weight percent water,
   (e) heating the cake obtained from (d) for a period of time of from about 1 to about 240 hours at a temperature of from about room temperature to about 300° C. to produce faujasitic crystalline aluminosilicate, and
   (f) separating the crystalline aluminosilicate from aqueous medium.

2. The process for producing zeolite Y which comprises:
   (a) mixing a silica-alumina hydrogel and a source of alkali metal hydroxide in the presence of water to obtain a composition expressed as oxide mole ratios in the range:

$SiO_2/Al_2O_3$ _____ 2 to 40
   Alkali metal oxide/$SiO_2$ _____ 0.7 to 6.0
   $H_2O$/alkali metal oxide _____ 12 to 300 in order to obtain a homogeneous mixture in aqueous medium,
   (b) digesting the mixture obtained in (a) at a temperature and time so that faujasite is produced in a subsequent crystallization step,
   (c) mixing silica-alumina hydrogel and digested mixture from (b) to obtain a homogeneous mixture having a composition expressed as oxide mole ratios in the range:

$SiO_2/Al_2O_3$ _____ 6 to 60
   Alkali metal oxide/$SiO_2$ _____ 0.32 to 0.7
   $H_2O$/alkali metal oxide _____ 25 to 300

(d) removing aqueous medium from the mixture obtained in (c) to obtain a cake containing from about 65 to about 80 weight percent water,
   (e) heating the cake obtained from (d) for a period of time of from about 1 to about 240 hours at a temperature of from about room temperature to about 300° C. to produce zeolite Y, and
   (f) separating the zeolite Y from aqueous medium.

3. The process for producing zeolite Y which comprises:
   (a) mixing a water soluble source of silica with alkali metal hydroxide and a source of alumina in a manner which avoids the formation of a gel to obtain a homogenous aqueous mixture having a composition expressed as oxide mole ratios in the range:

$SiO_2/Al_2O_3$ _____ 2 to 40
   Alkali metal oxide/$SiO_2$ _____ 0.7 to 6.0
   $H_2O$/alkali metal oxide _____ 12 to 300

(b) digesting the mixture obtained in (a) at a temperature and time so that faujasite is produced in a subsequent crystallization step,
   (c) adding silica and alumina sources in aqueous solutions in separate streams to the digested composition obtained from (b),
   (d) removing aqueous medium from the mixture obtained in (c) to obtain a cake containing from about 65 to about 80 weight percent water,
   (e) heating the cake obtained from (d) for a period of time of from about 1 to about 240 hours at a temperature of from about room temperature to about 300° C. to produce zeolite Y, and
   (f) separating the zeolite Y from aqueous medium.

4. The process of claim 3 wherein step (a) is conducted by mixing a water soluble source of silica and alkali metal hydroxide in the presence of water, and mixing the silica-alkali metal hydroxide mixture with a source of alumina to obtain a composition expressed as oxide mole ratios in the range:

$SiO_2/Al_2O_3$ _____ 9 to 30
Alkali metal oxide/$SiO_2$ _____ 1.0 to 3.0
$H_2O$/alkali metal oxide _____ 15 to 40

5. The process of claim 3 wherein step (a) is conducted by mixing a water soluble source of alumina and alkali metal hydroxide in the presence of water to obtain a solution having a pH above about 12 and mixing the solution with a source of silica to obtain a composition expressed as oxide mole ratios in the range:

$SiO_2/Al_2O_3$ _____ 9 to 30
Alkali metal oxide/$SiO_2$ _____ 1.0 to 3.0
$H_2O$/alkali metal oxide _____ 15 to 40

6. The process of claim 1 wherein the source of silica is sodium silicate and the zeolite Y product has a silica to alumina mole ratio above about 3.9.

7. The process of claim 2 wherein the source of silica is sodium silicate and the zeolite Y product has a silica to alumina mole ratio above about 3.9.

8. The process of claim 3 wherein the source of silica is sodium silicate and the zeolite Y product has a silica to alumina mole ratio above about 3.9.

9. The process of claim 4 wherein the source of silica is sodium silicate and the zeolite Y product has a silica to alumina mole ratio above about 3.9.

10. The process of claim 5 wherein the source of silica is sodium silicate and the zeolite Y product has a silica to alumina mole ratio above about 3.9.

11. The process of claim 5 wherein the source of alumina is sodium aluminate.

References Cited

UNITED STATES PATENTS

| | | | |
|---|---|---|---|
| 3,094,383 | 6/1963 | Dzierzanowski et al. | 23—112 |
| 3,130,007 | 4/1964 | Breck | 23—113 |
| 3,321,272 | 5/1967 | Kerr | 23—113 |
| 3,341,284 | 9/1967 | Young | 23—112 |
| 3,343,913 | 9/1967 | Robson | 23—113 |
| 3,433,589 | 3/1969 | Ciric et al. | 23—113 |

EDWARD J. MEROS, Primary Examiner

U.S. Cl. X.R.

23—112